United States Patent
Lass et al.

[11] Patent Number: 5,914,831
[45] Date of Patent: Jun. 22, 1999

[54] TAPE DRIVE WITH BEZEL HAVING CARTRIDGE EJECTION RETARDING PROJECTIONS

[75] Inventors: Ronald L. Lass, Longmont; David M. Romig, Brighton; Daniel W. Hoekstra, Louisville, all of Colo.

[73] Assignee: Exabyte Corporation, Boulder, Colo.

[21] Appl. No.: 08/497,460

[22] Filed: Jun. 26, 1995

[51] Int. Cl.$^6$ ................................................ G11B 5/008
[52] U.S. Cl. .......................................... 360/96.5; 360/92
[58] Field of Search .............................. 360/96.5, 96.6, 360/92

[56] References Cited

U.S. PATENT DOCUMENTS

| | | | |
|---|---|---|---|
| 4,785,365 | 11/1988 | Ohkita | 360/99.06 |
| 5,119,251 | 6/1992 | Matsuda | 360/96.05 |
| 5,498,116 | 3/1996 | Woodruff et al. | 360/92 X |

FOREIGN PATENT DOCUMENTS

| | | | |
|---|---|---|---|
| 0-082-505 | 6/1983 | European Pat. Off. | 360/99.6 |

OTHER PUBLICATIONS

IBM Technical Disclosure Bulletin vol. 21 No. 5 pp. 2033–2034 Oct., 1978 360/99.06.

*Primary Examiner*—John H. Wolff
*Attorney, Agent, or Firm*—Nixon & Vanderhye, P.C.

[57] ABSTRACT

A bezel (100) mitigates cartridge over ejection from a tape drive, the tape drive receiving and ejecting a cartridge of magnetic tape for performing recording and reading operations with respect to the magnetic tape. The bezel (100) comprises both a bezel plate (102) and a pair of cartridge braking projections (120) attached thereto. The cartridge braking projections partially extend into a cartridge slot (104) and retard motion of a cartridge travelling through the slot. The cartridge braking projections (120) are resilient and bidirectionally flexible, preferably being formed of cellular urethane. The cartridge braking projections (120) extend into the slot by a predetermined distance above a lower cartridge plane (115). In one embodiment, the bezel (100) is attached to a rack which accommodates the tape drive.

11 Claims, 5 Drawing Sheets

TAPE DRIVE WITH BEZEL HAVING CARTRIDGE EJECTION RETARDING PROJECTIONS

BACKGROUND

1. Field of Invention

This invention pertains to drives which transduce information to and from magnetic tape, and particularly to drives which accommodate tape-containing cartridges.

2. Related Art and Other Considerations

For decades magnetic tape has served as a medium for recording and storage of information. More recently, for such purposes magnetic tape has been housed in cartridges or cassettes. To perform recording and reading operations with respect to the tape, the cartridge is inserted into a device variously names as a tape drive, tape recorder, or tape deck. Examples of a cartridge-utilizing tape drives are the 8200 and 8500 family of helical scan recorders produced by Exabyte Corporation.

Typically a tape drive includes a frame wherein are housed various components and subsystems. For a helical scan recorder, for example, such components include cartridge loading/ejecting apparatus, apparatus for extracting tape from the cartridge into a tape path; and, a rotating drum proximate the tape path. The drum has one or more heads which transduce information relative to the tape.

Some drives tend to experience a phenomena known as over ejection. Over ejection occurs when the drive's loading/ejecting apparatus too vigorously or forcefully discharges a cartridge from the drive. Over ejection results in the ejected cartridge travelling too far out of the drive, perhaps with the cartridge even being launched totally out of the drive.

One particular cartridge, a 4 mm cartridge, is fashioned with a physical feature for mitigating the over ejection phenomena. Such 4 mm cartridge has a small circular depression or detente on a surface thereof which is engaged by a spring-like member internal to the drive slot. Engagement of the cartridge depression by the drive's spring-like member serves to lessen over ejection potential. Other standard tape cartridges, such as an 8 mm tape cartridge, do not have over ejection-combating physical features.

Over ejection is particularly problematic when a drive is incorporated into automated information handling systems such as a cartridge library. In a cartridge library, a cartridge transport device (sometimes referred to as a cartridge picker or gripper or end effector) removes an ejected cartridge from its nominal ejection position in a drive. In the nominal ejection position, the ejected cartridge extends partially from the drive slot by a predetermined protrusion distance. Cartridge transport devices assume that a cartridge to be extracted from a drive protrudes from the drive slot by the predetermined protrusion distance with only slight tolerance.

Consequently, over ejection foils a library's assumption regarding cartridge location, and can result in numerous problems including cartridge grip failure.

Tape drives typically have a drive frame, a front portion of which is commonly termed a bezel. The bezel has an elongated, essentially rectangular slot through which the cartridge travels as the cartridge is inserted into and ejected from the drive. During cartridge insertion and ejection, a housing or case of the cartridge typically contacts or even scrapes a lower perimeter of the bezel's slot. Such contact tends to scrape off small particles of the cartridge case, resulting in dirt or debris. Such dust can dislodge and enter either the interior of the cartridge or the interior of the drive, and thereby contaminate the tape. Tape contamination, in turn, endangers tape transducing integrity.

What is needed, therefor, is apparatus for combating the over ejection problem of tape drives. Advantageously such apparatus should not contribute to dust generation or tape contamination.

SUMMARY

A bezel mitigates cartridge over ejection from a tape drive, the tape drive receiving and ejecting a cartridge of magnetic tape for performing recording and reading operations with respect to the magnetic tape. The bezel comprises both a bezel plate and a pair of cartridge braking projections attached thereto. The cartridge braking projections partially extend into a cartridge slot and retard motion of a cartridge travelling through the slot. The cartridge braking projections are resilient and bidirectionally flexible, preferably being formed of cellular urethane. The cartridge braking projections extend into the slot by a predetermined distance above a lower cartridge plane. In one embodiment, the bezel is attached to a rack which accommodates the tape drive.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
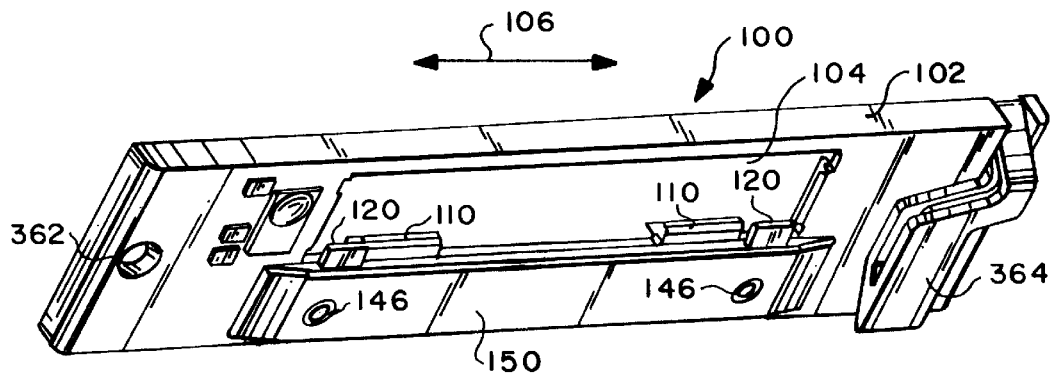
FIG. 1 is a front perspective view of a bezel according to an embodiment of the invention.
Figure 2:
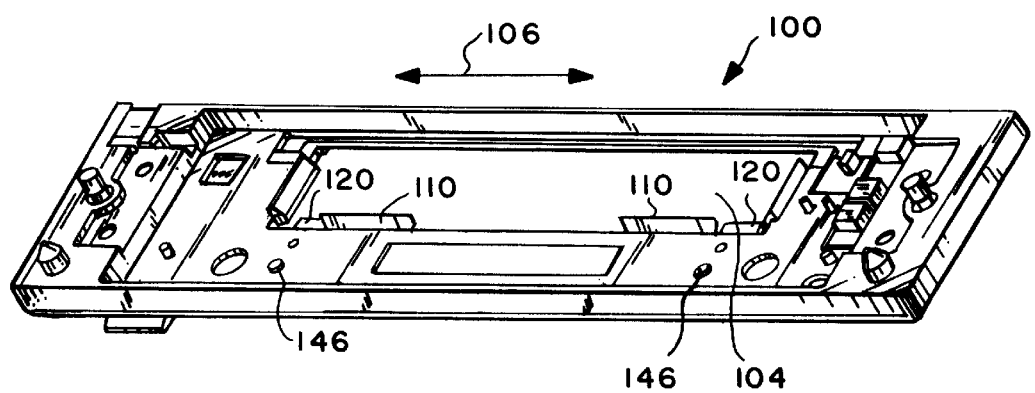
FIG. 2 is a rear perspective view of the bezel of FIG. 1.

FIG. 1 and FIG. 2 show front and rear faces, respectively, of a bezel 100 for an unillustrated tape drive. Bezel 100 includes a substantially rectangular bezel plate 102. As described hereinafter, bezel plate 102 fits over a front surface of a tape drive and can be, for example, part of a drive-accommodating rack assembly.

Figure 6:
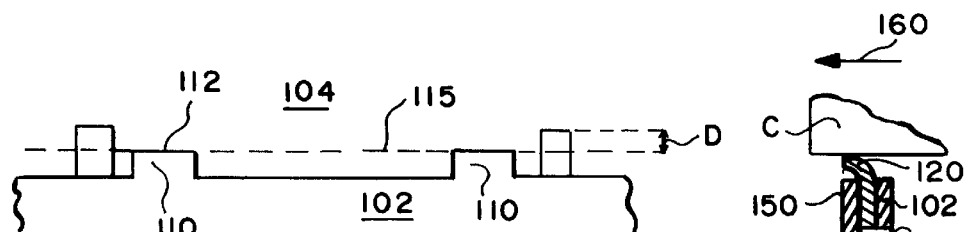
FIG. 6 is a schematic front view of a portion of the bezel of FIG. 1.
Figure 3:
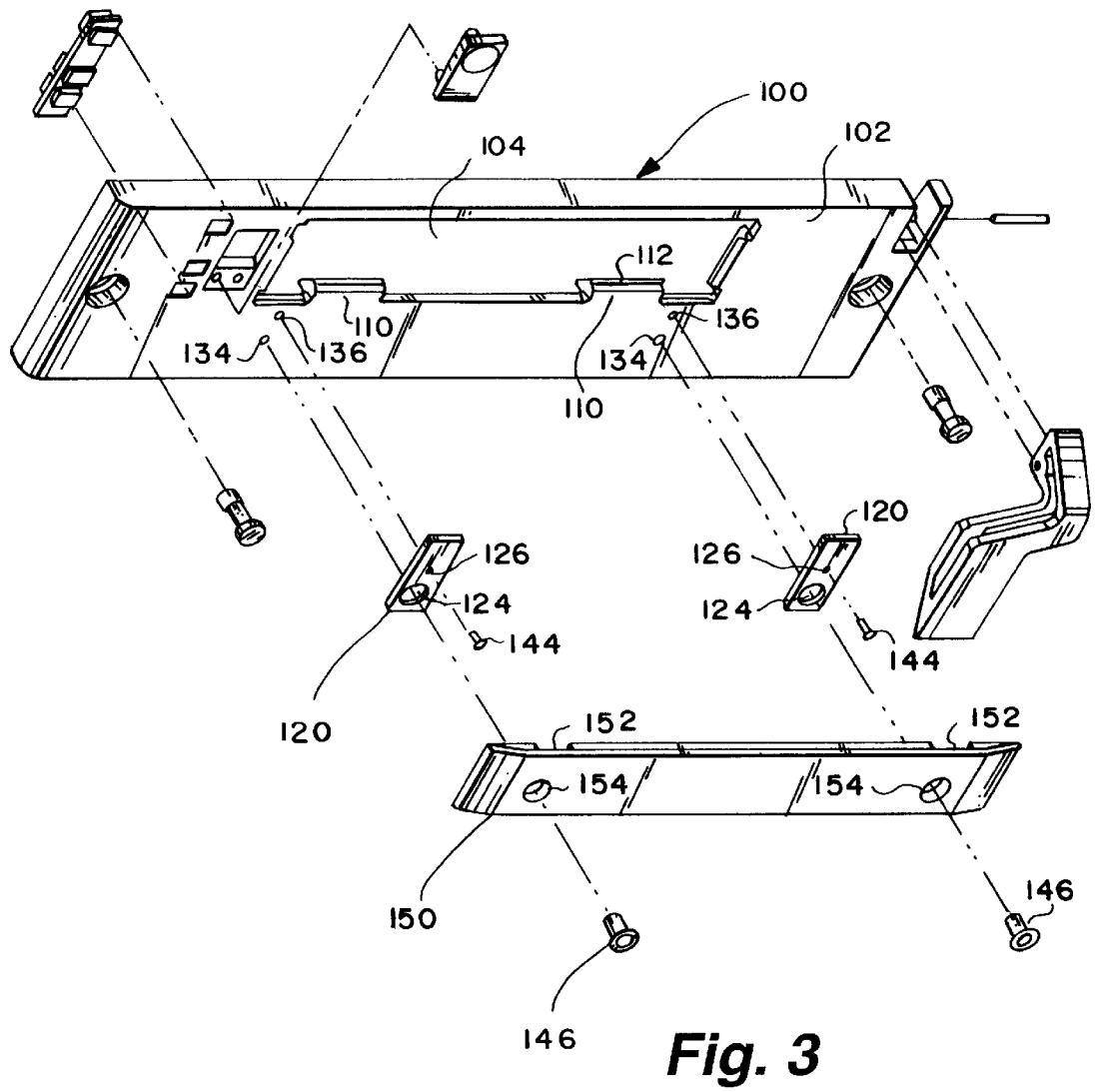
FIG. 3 is an exploded front view of the bezel of FIG. 1.

Bezel plate 102 has numerous features, including a cartridge-receiving slot 104. As shown in FIG. 1–FIG. 3, slot 104 is essentially rectangular and has a slot major dimension which extends parallel to arrow 106. Bezel plate 102 has two gateway ramps 110 formed thereon to extend into slot 104 from a bottom peripheral horizontal surface defining slot 104. As shown in FIG. 6, top surfaces 112 of gateway ramps 110 define a lower cartridge plane 115. As a cartridge is inserted into or ejected from the drive, a bottom surface of the cartridge case rides along top surfaces 112 of gateway ramps 110 and thereby lies in lower cartridge plane 115.

Bezel 100 also has two cartridge braking projections or brakes 120 attached thereto. As shown in FIG. 1 and FIG. 2, each cartridge braking projection 120 is situated along the slot-defining bottom horizontal peripheral surface, and particularly between a slot-defining vertical peripheral surface and a gateway ramp 110. The cartridge braking projections 120 are spaced apart along the slot-defining bottom horizontal peripheral surface in the direction of the slot major dimension (which is parallel to arrow 106).

Figure 5:
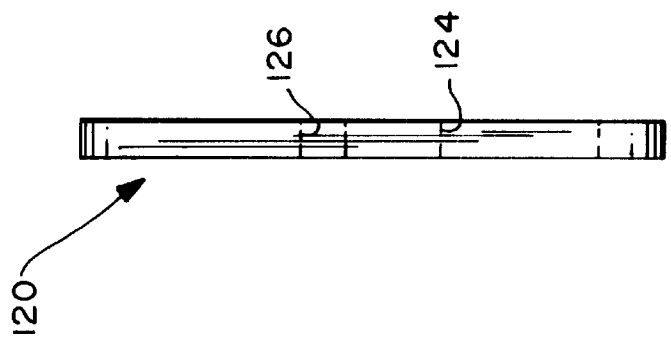
FIG. 5 is a side view of the braking projection of FIG. 4.
Figure 4:
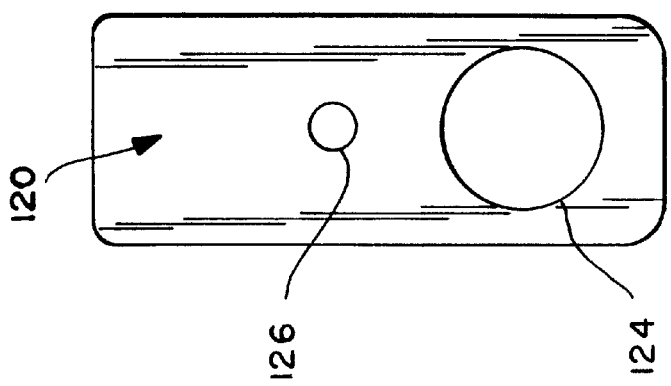
FIG. 4 is a front view of a braking projection included in the bezel of FIG. 1.

As shown in more detail in each of FIG. 3, FIG. 4, and FIG. 5, cartridge braking projections 120 are each a substantially rectangular piece of resilient or flexible material. While cartridge braking projections 120 are preferably formed of a cellular urethane, and more preferably the cellular urethane marketed by Rogers Corporation of East Woodstock, Conn., as PORON® 4701, it should be understood that other materials performing the same function as described herein are also usable. Such other materials include, for example, mylar and neoprene.

As shown in FIG. 4 and FIG. 5, cartridge braking projections 120 each have a width (in the direction of arrow 160) on the order of 0.300 inches, a height of 0.740 inches, and a width of 0.050 inches. Moreover, as shown not only in FIG. 4 and FIG. 5 but also in FIG. 3, cartridge braking projections 120 have two apertures 124 and 126 formed therein. The first and larger aperture 124 is formed below the second (smaller) aperture 126. As shown in FIG. 3, brake apertures 124 and 126 are aligned with corresponding apertures 134 and 136 in bezel plate 102.

Each cartridge braking projection 120 is secured to bezel plate 102 by two fasteners 144 and 146. As shown in FIG. 3, fastener 144 extends through brake aperture 126 and is anchored into bezel aperture 136. Bezel plate 102 carries a cover member 150. An inside surface of cover member 150 has vertical notches 152 (see FIG. 3) positioned and sized so that cartridge braking projections 120 can be sandwiched between cover member 150 and bezel plate 102. As shown in FIG. 3, cover member 150 has a pair of cover apertures 154, each cover aperture 154 being aligned with brake aperture 124 and bezel aperture 134, so that fastener 146 can extend through all three apertures for anchoring in bezel plate 102.

Figure 7:
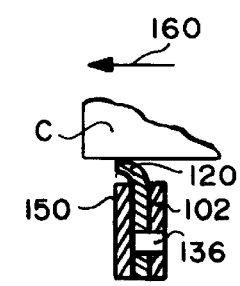
FIG. 7 is a schematic side cross sectional view of the bezel of FIG. 1.

When assembled in the manner shown in FIG. 3, cartridge brake projections 120 extend in cantilever fashion into slot 104 by a distance D=0.034 inch beyond lower cartridge plane 115 (see FIG. 6). As such, upon ejection of a cartridge such as cartridge C shown in FIG. 7, cartridge brake projection 120 deflects outwardly from the drive, thereby moderating or retarding motion (e.g., momentum) of cartridge C travelling in an ejection direction 160 through slot 104. Accordingly, cartridge C extends partially from the drive slot by a predetermined (nominal) protrusion distance.

In stating herein that bezel 100 is a bezel for a drive, it is meant that bezel 100 covers a front surface of the drive. Such covering can occur in several ways. For example, bezel 100 can be attached to the drive frame or form a part of a rack which accommodates a drive frame. The bezel forming part of such a rack is particularly understood in terms of a rack employed in a cartridge library, as hereinbelow described.

Figure 8:
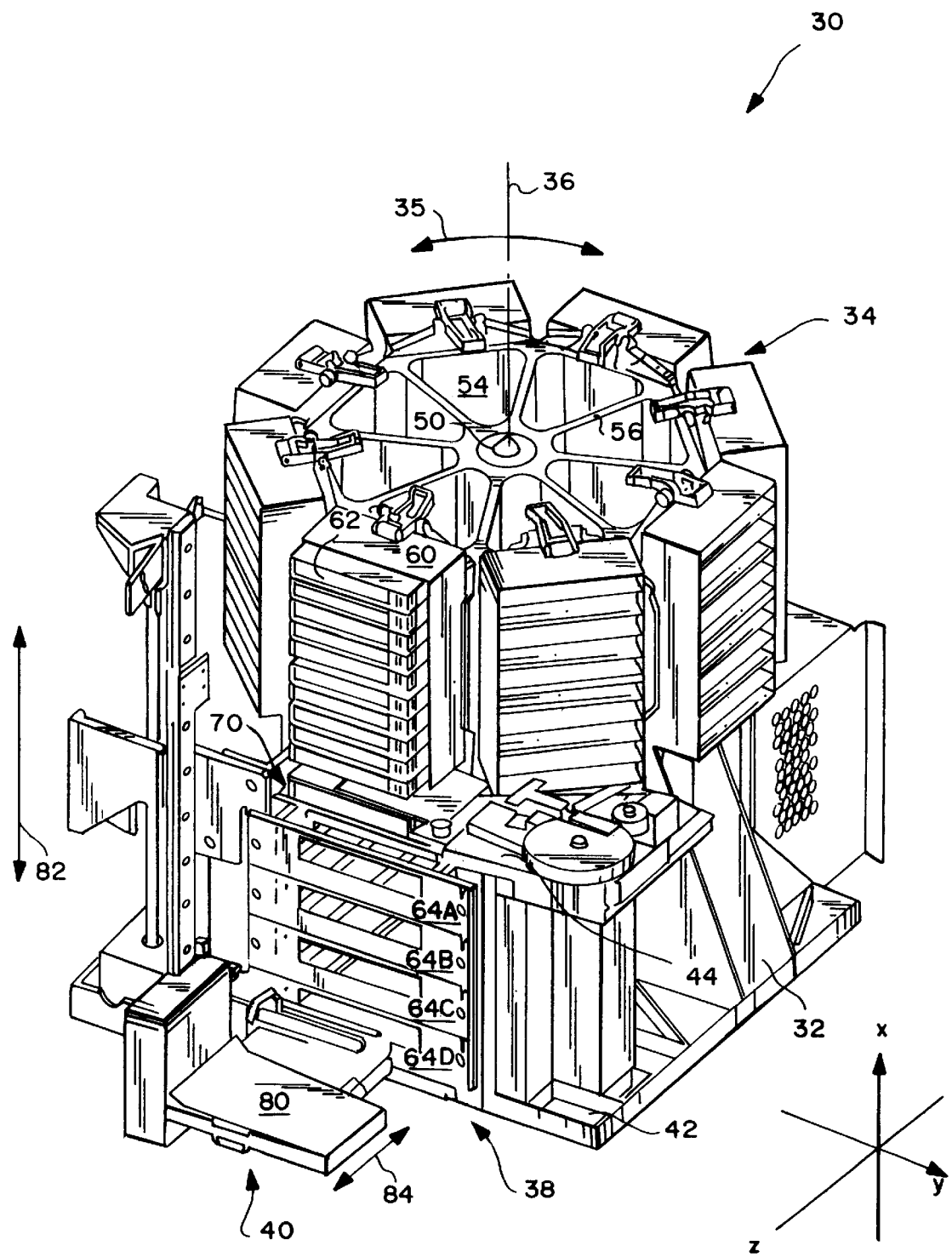
FIG. 8 is a front perspective view of a cartridge library.

FIG. 8 shows portions of a cartridge handling library 30. In general, library 30 includes a library frame 32, a drum-like member or hub 34 mounted on frame 32 for rotational motion (e.g., in the direction shown by arrow 35) about a drum or hub axis 36; a drive drawer section 38 formed in frame 32; and, a cartridge transport assembly 40. Library frame 32 has a frame lower support surface 42 formed near its bottom and a frame upper support surface 44 provided at its top.

Hub 34 has hub faces 52 upon which cartridge racks 60 (also known as cartridge packs or receptacles) are selectively mounted. In the illustrated embodiment, each cartridge rack 60 houses ten cartridges. The term data storage unit or "unit" is used interchangeably herein for "cartridge", which is also known in the industry as "cassette".

In the illustrated embodiment, drive drawer section 38 of frame 32 houses four drive drawers racks 64A–64D In the ensuing discussion, reference to "rack 64" is a generic reference to any one of the drawers or racks in drive drawer section 38. Drive drawer section 38 of library frame 32 is described in more detail below in connection with FIG. 8 and FIG. 9. FIG. 8 shows that drive drawer rack 38 is situated in the lower front portion of library frame 32.

Cartridge transport assembly 40 includes a cartridge picker mechanism 80 (hereinafter also referred to as the "picker" or "end effector") which is displaced both in a vertical or "X" direction (e.g., along arrow 82 shown in FIG. 8) and in a picker approach/retreat direction or "Z" (e.g., along arrow 84 shown in FIG. 8). Picker 80 selectively moves a cartridge from the active cartridge rack 60 to a selected one of the drives in drive drawer section 38. Conversely, picker 80 removes a cartridge from a designated one of the drives in driver drawer section 38 and stores the removed cartridge in the active cartridge rack 60.

Figure 9:
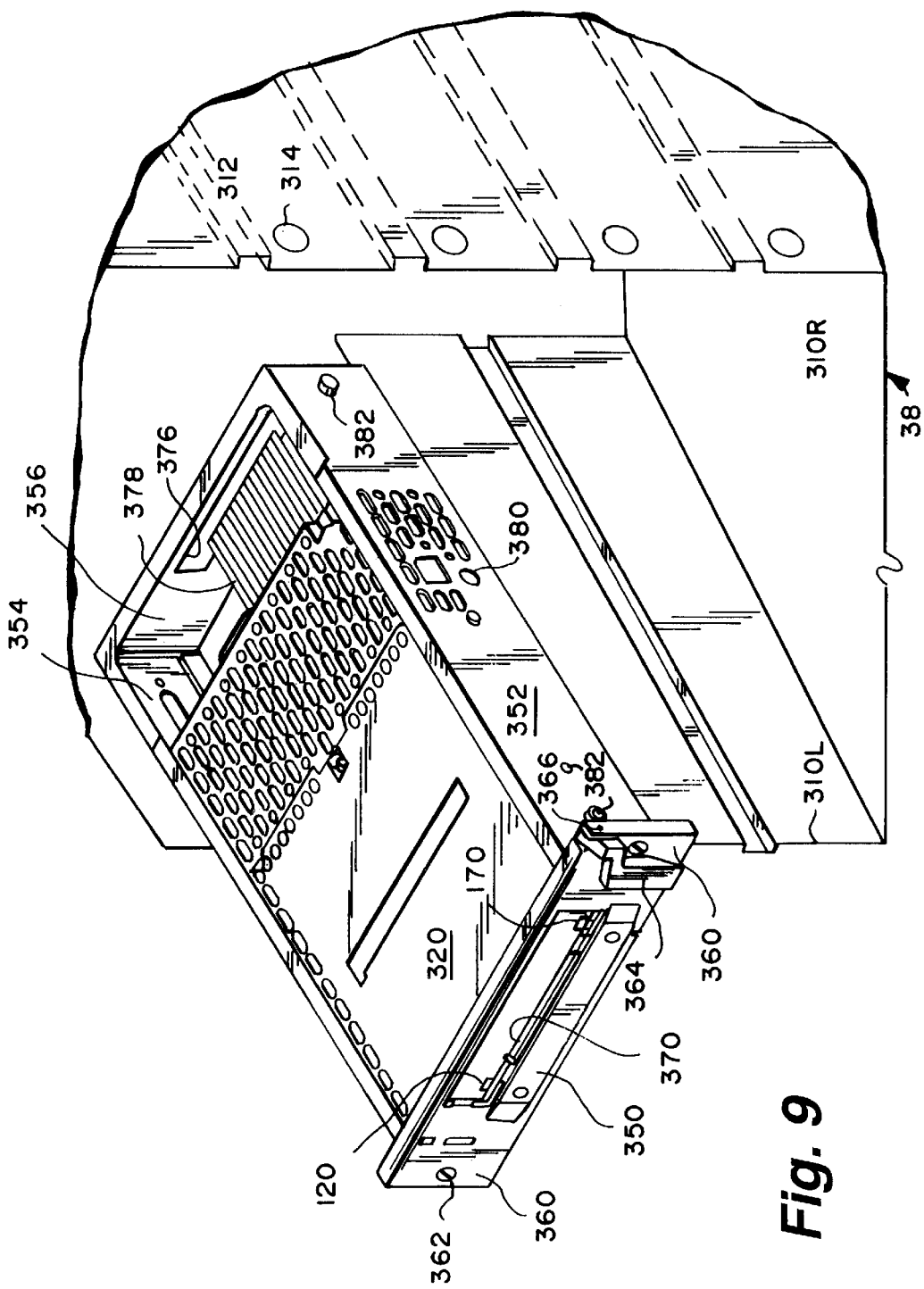
FIG. 9 is a front perspective view of a drive rack included in the library of FIG. 8.

FIG. 9 shows drive drawer section 38 of library frame 32 in more detail. Drawer section 38 includes two vertical walls 310R and 310L formed in a casting constituting library frame 32. Each wall 310R, 310L has four slots or rack alignment channels 312 formed therein to extend in the Z direction as shown in FIG. 9 and spaced apart in the manner described below for accommodating the drawers 64. On its front surface (e.g., a surface in the XY plane), drawer section 38 has fastener receiving apertures 314 provided thereon, two apertures 314 for each drive.

As mentioned above, drive drawer section houses four drive racks or drawers 64A–64D. Each rack modularly encloses an I/O drive 320, such as a helical scan tape drive. One example of such a drive is EXB-8505 manufactured by Exabyte Corporation, which (among other things) performs data input and output operations with respect to magnetic tape media.

A rack 64 is illustrated in FIG. 9 as being generally of rectangular shape and including a rack front wall 350; a rack right side wall 352; a rack left wall 354; and, a rack rear wall 356. At their bottoms, each of the walls have a ledge formed thereon, thereby collectively providing a support ledge 358 for supporting the I/O drive 320.

As seen in FIG. 9, rack front wall 350, also known as bezel plate 102, has a greater extent across the width of rack 64 than other portions of rack 64. In particular, rack front wall 350 has laterally protruding edges 360. Each edge 360 has a fastener-receiving aperture 314 formed therein. As understood with reference to FIG. 8 and the drive rack illustrated therein, unillustrated fasteners extend through apertures 362 and into apertures 314 in rack 38 for securing rack 64 to the drive rack 38.

At its upper right hand corner as seen in FIG. 8, rack front wall 350 has an ejection lever 364 pivotally mounted about pivot pin 366. Lifting a distal end of ejection lever 364 upwardly causes lever 364 to pivot about pin 366, thereby wedging a proximal end of lever 364 between the back surface of front wall 350 and the front wall of rack 38, which serves to partially eject rack 64 from drive rack 38.

Rack front wall 350 also has a cartridge entry slot 370 (the same as slot 104) extending therethrough, thereby permitting selective insertion and removal of cartridges from the drive 320 housed in rack 64. Slot 370 of rack 64 is aligned with a comparable cartridge-receiving slot in its corresponding drive 320. Rack side walls 352 and 354 have a plurality of ventilation apertures 380. Apertures 380 serve to allow air to circulate around the drive 320 housed in rack 64. In addition, each rack side wall 352 and 354 have a pair of alignment pins 382 provided thereon for slidable insertion into channels 312 formed in drive rack 38.

Rack section 38 and racks 64 modularly installed therein facilitate efficient installation and removal, as well as interchange, of I/O drives 320. A drive rack 64 can easily be removed from rack section 38 by unfastening the rack fasteners, pivoting the rack ejection lever 364, and, sliding the rack out of its slots 312. Installation involves converse operations. Further details of racks 64 are understood with reference to U.S. Pat. No. 5,498,116, entitled CARTRIDGE LIBRARY AND METHOD OF OPERATION, commonly assigned herewith and incorporated herein by reference.

Advantageously, bezel 100 of the present invention minimizes any over ejection problem. Moreover, the resilient and flexible nature of cartridge brake projections 120 tend to prevent wear of a cartridge case, thereby minimizing scraping and dust generation, which in turn, lessens opportunity for tape contamination.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A tape drive which receives a cartridge of magnetic tape for performing recording and reading operations with respect to the magnetic tape, the tape drive including a drive frame and a bezel plate which at least partially covers a front surface of the drive frame, the drive frame having a cartridge-receiving cavity therein wherein lies a lower cartridge plane, the bezel plate having a cartridge-receiving slot formed therein, the bezel plate further having a projection attached to the bezel plate and partially extending upwardly into the cartridge slot beyond the lower cartridge plane for retarding motion of a cartridge being ejected from the slot.

2. The apparatus of claim 1, wherein the bezel is attached to a rack which accommodates the drive frame.

3. The tape drive of claim 1 wherein the projection deflects outwardly from the drive in an ejection direction to modulate momentum of a cartridge being ejected from the slot.

4. A cartridge library comprising:

a library frame;

a plurality of cartridge storage locations mounted on the library frame;

at least one drive rack mounted in the library frame;

a drive mounted in the drive rack, the drive having a cartridge-receiving cavity therein wherein lies a lower cartridge plane;

a cartridge transport device for transporting cartridges between the storage locations and the drive;

wherein the drive rack includes a bezel, and wherein the bezel comprises:

a bezel plate, the bezel plate having a cartridge-receiving slot formed therein;

a projection attached to the bezel plate and partially extending upwardly into the cartridge slot beyond the lower cartridge plane for retarding motion of a cartridge being ejected from the slot.

5. The cartridge library of claim 4, wherein the projection deflects outwardly from the drive in an ejection direction to modulate momentum of a cartridge being ejected from the slot.

6. The apparatus of claims 1 or 4, wherein the bezel comprises two projections spaced apart along a major dimension of the slot.

7. The apparatus of claims 1 or 4, wherein the projection is resilient.

8. The apparatus of claim 7, wherein the projection is formed of cellular urethane.

9. The apparatus of claim 4, wherein the projection extends into the slot by a distance of 0.034 inches above a lower cartridge plane.

10. The apparatus of claim 4, wherein the bezel is attached to a rack which accommodates the tape drive.

11. The apparatus of claim 1, wherein the projection extends into the slot by a distance of 0.034 inches above the lower cartridge plane.

* * * * *